United States Patent Office 3,581,382
Patented June 1, 1971

3,581,382
DIFFUSION BRAZING OF ALUMINUM AND ALUMINUM BASE ALLOYS
Robert R. Wells, La Mirada, Bobby J. Mays, Redondo Beach, and Terry A. Krinke, Manhattan Beach, Calif., assignors to Northrop Corporation, Beverly Hills, Calif.
No Drawing. Filed Oct. 7, 1968, Ser. No. 765,678
Int. Cl. B23k 31/02, 35/24
U.S. Cl. 29—498                             9 Claims

ABSTRACT OF THE DISCLOSURE

A self-fluxing method for joining two surfaces of aluminum and aluminum base alloys comprising coating one of the mating surfaces with a thin layer of copper, then placing a thin layer of tin over the copper, placing the two pieces to be joined together and heating to at least the eutectic temperature for a ternary aluminum-copper-tin alloy system. The maximum temperature of heating can be lowered by the addition of a small amount of silver which is coated on the copper before the tin layer is placed thereon.

---

Through the utilization of various fluxing agents it has been possible to braze aluminum and aluminum alloys. However, in applications such as heat exchangers and various complex aluminum components having small openings or other areas in which to trap flux, considerable expenditure of effort is required to remove the flux utilized. In aircraft and other load-bearing structural components, the use of honeycomb core has recently gained considerable attention and found ultimate utilization. With the several flux brazing systems currently available, it is impossible to braze a sealed structural component utilizing a nonperforated honeycomb core. Thus, particularly in the fabrication of honeycomb panels it became imperative to develop a method of brazing the aluminum alloys without the presence of any flux material.

In the past, an effort has been made at overcoming the requirement for flux in brazing aluminum members. One method previously disclosed involved the plating of the aluminum members to be joined with a metal selected from the group consisting of silver, copper, gold, tin and zinc, and raising the mated surfaces to be joined to a temperature between the binary eutectic formation temperature and melting point of the aluminum members. Unfortunately, this previously developed method does not provide a satisfactory bond unless the mating surfaces of both of the members to be joined are coated with one of the enumerated bonding metals. It was found that if only one of the surfaces to be joined was coated with the bonding metal, the resulting joint, though leak tight, could not sustain any significant stress. Further, inspection by metallography techniques indicated that no diffusion bonding transpired. Only when both mating surfaces were individually coated with the bonding metal was a joint achieved. It should be apparent that it is virtually impossible, and certainly not suitable from an economic standpoint, to attempt to coat the edges of a honeycomb material which is to be bonded to a sheet of aluminum alloy. Thus, the prior method which requires the coating of both of the mating surfaces with a bonding metal in order to obtain a sufficient joint capable of bearing stress is not suitable for many applications.

Thus, it is an object of this invention to provide a new method for the diffusing brazing of aluminum and aluminum alloys.

Another object of this invention is to provide a method for the diffusion brazing of aluminum and aluminum alloys wherein only one of the mating surfaces need be treated prior to brazing.

It has been unexpectedly found that a unique combination of selected bonding metals, coated on only one mating surface of aluminum parts in a certain predetermined manner, provides superior diffusion brazing heretofore unobtainable. Unlike prior fluxless brazing methods, only one of the brazed surfaces need be coated in the manner to be described in order to achieve this superior result. This, briefly, the invention comprises first, coating one of the aluminum or aluminum alloy surfaces to be brazed with a coating of copper in a thin layer. This can be accomplished, as will be indicated, by electrodeposition among other means. Next, a coating or thin film of tin is deposited upon the copper. The second piece to be brazed to the coated piece is then placed in contact therewith and the pieces are heated in a partial-vacuum/inert-atmosphere to a temperature of at least the ternary eutectic temperature of an aluminum-copper-tin alloy. This temperature is about 540° C. If it is desired to lower the temperature, up to 40 weight percent of the tin/copper coating can be replaced by an additional coating of silver. When the silver coating is utilized, it is placed directly upon the coating of copper, with the tin coating covering the silver one. In other words, it is important that the uncoated surface to be joined come directly in contact with the film of tin for reasons which will be explained in detail below. When the additional layer of silver is utilized, the necessary temperature of heating can be lowered to, for example, 510° C. for 17 weight percent silver which may be the eutectic point for the quaternary system. It is believed that the invention will be better understood from the following detailed description and specific examples.

The herein method for brazing aluminum parts pertains to both pure aluminum structures and those formed of aluminum alloys. Conventional aluminum alloys contain, for example, portions of aluminum oxide, copper, tin, silicon, zinc, manganese, silver and magnesium and are usually completely covered by a protective layer of aluminum oxide which must be removed before brazing. Thus, hereinafter the term "aluminum" refers to both parts constructed of aluminum and aluminum alloys as is contemplated by the herein invention.

As indicated, the prior art technique most closely related to that of the herein invention involved the coating of aluminum parts to be bonded with a thin film of a single bonding metal. Also as indicated, a strong bond having a diffusion of the material in the bond joint was not achieved unless both of the surfaces to be joined were cleaned of aluminum oxide prior to coating. Even then, bonding only occurred at the coated area. In other words, there was no flowing of the bond metal to provide a filleted joint as commonly occurs in normal brazing operation utilizing a flux. The reason for this was that there was no wetting of the aluminum surfaces that were still covered with aluminum oxide adjacent to the plated surfaces in this prior technique. Therefore, if it was desired to have a flowing of the bonding material to provide a filleted area, it was necessary to clean and coat all surfaces to be brazed with the bonding metal. In practice this was normally accomplished by zincating the aluminum surface lightly and then coating with one of the indicated bonding metals.

In the process of deriving the herein invention, the aluminum-copper binary eutectic system was studied through the production of lap joints. Lap joints were prepared by coating aluminum alloy sheets with approximately 0.0002 inch thickness of copper through electrodeposition. The aluminum-copper phase diagram indicates the lowest melting eutectic occurs at 548° C. at a composition of 67 weight percent aluminum and 33 weight percent copper. Thus, lap joints were heated to that eutectic temperature. It was found that the copper tended to erode the aluminum base alloy to a limited extent. The resulting joints possessed fair strength properties, but the eutectic reaction temperature of 548° C. is slightly high to have broad practical application to a wide variety of aluminum-base alloys because many of these alloys are embrittled by incipient melting which occurs below 548° C.

A like study of lap joints was made utilizing a binary system of aluminum and tin. Once again, a review of the phase diagram of the binary system was made. The lowest temperature eutectic in this system occurs at 232° C. at a composition of 99.5 weight percent tin and 0.5 weight percent aluminum. Lap joints produced at this temperature did not exhibit sufficient strength properties to be practically usable. Other eutectic-forming metals were additionally studied in a like manner. Overall, it was found that copper appeared to be the best intermediate material to be used in bonding aluminum alloys. The drawbacks noticed from the utilization of copper included the high joining temperature required, a lack of wetting and a poor flow.

The herein invention was discovered in a quite unexpected manner. It was decided in a series of experiments to utilize cleaned and copper plated aluminum surfaces for a soldering application. The solder utilized was a conventional lead/tin solder. The initial results were fairly encouraging. However, the strength of the joints was limited by the bonding strength of the copper that had been electroplated onto the aluminum surface. In order to increase the bonding strength, it was decided to solid state diffuse some of the copper into the aluminum to provide a stronger bond between the copper layer and the aluminum. Merely as an expediency, a previously soldered joint was utilized and the temperature was increased for the diffusion treatment to slightly below that of the aluminum/copper eutectic melting temperature. Unexpectedly, at this point the entire joint region suddenly liquified, wet and flowed just as in a normal brazing process. Immediately further steps were taken to investigate the reasons for the aforegoing results. Further investigation indicated that the lead was not a necessary component and that the utilization of tin alone in combination with the copper plated surface would accomplish the desired end result. Through a subsequent analysis it is now believed that the molten tin penetrates the aluminum oxide which is found on all aluminum materials and wets the boundary between the aluminum and the oxide at some temperature above 375° C. Increasing the temperature allows the remaining tin to enter into a ternary eutectic with the aluminum copper, forming joints at approximately 540° C.

The temperature of 540° C. can be obtained from the liquidus diagram of the ternary aluminum-copper-tin system and is the eutectic point at a composition of 61 weight percent aluminum, 28 weight percent copper and 11 weight percent tin. To confirm the existence of the eutectic, an electron microprobe analysis of a specimen made in accord with the aforegoing description was made, and found to contain 60% aluminum, 26% copper and 14% tin. This thus confirmed that a eutectic composition was obtainable at the joints formed in accord with this invention at the eutectic temperature of 540° C. As a result, it can be seen that in the practice of the herein invention one need only initially coat a flat sheet of aluminum with copper, electrodeposit a film of tin over the copper, and not worry in any way about treating the other member to be joined, which, for example, can be a honeycomb material. The outer tin film first penetrates the oxide coating of the untreated member. Later, as diffusion occurs among copper, tin, and aluminum, their ternary eutectic is formed. This ternary eutectic composition provides a fluxless braze alloy which wets and forms a well filleted joint.

The brazing temperature of 540° C. is higher than desired for some aluminum alloys because of their incipient melting temperatures. As a result, further effort was directed to lowering the eutectic reaction temperature by adding a fourth alloy element to form a quaternary system. It was found that addition to the braze alloy composition of about 17 weight percent silver lowered the flow point of the braze alloy by 30° C. to about 510° C. without affecting the quality of the bond joint.

To practice the method of the invention, one surface to be coated with the materials of this invention is first cleaned by a conventional cleaning process and then is ready for the deposition of the film of copper. The copper can be deposited by any conventional means, including electroplating, electroless techniques, vacuum deposition or vapor plating. It has been found that the results of this invention are best achieved when a minimum of about 10 milligrams of copper per square inch of surface is plated. There is no necessary upper limit to the amount of copper that can be plated. However, generally between 30 to 60 milligrams of copper per square inch are used, depending on the joint configuration. After the copper has been deposited on the aluminum surface, the copper surface is then coated with tin. The amount of tin required is approximately equal to the quantity of copper, that is, 30 to 60 mg. per square inch. This assures that a sufficient amount of tin is present to penetrate the oxide coating on the uncoated mating surface and to form the ternary eutectic liquid. The amounts of material deposited are controlled by assuming 100% efficiency for the electroplating baths and the application of Faraday's laws.

If silver is additionally utilized, it instead will be deposited on top of the copper prior to the deposition of the tin. As previously indicated, the silver will comprise about 17% of the total amount of the copper/tin utilized. Thus, for example, if 60 mg. total of copper and tin per square inch of surface is deposited, 10.2 mg. per square inch of surface of silver can be utilized. It should be pointed out that 17% is not necessarily a precise figure and the amount of silver can vary from 4 up to as high as 40 percent of the total amount of copper and tin.

The uncoated surface need only be cleaned of grease and dirt prior to the brazing process.

The brazing should be preferably carried out in an inert atmosphere such as an argon atmosphere at a pressure of about 300 torr. It is found that a full vacuum retards alloy wetting and flow and is thus not desirable. Only sufficient mechanical pressure is needed to hold the mating surfaces in intimate contact during the heating period. The mating surfaces are kept at the braze temperature for a period of time sufficient to allow adequate wetting, flow and filleting of the braze alloy. This of course can be done through visual observation and will vary depending upon the type of joints involved as well as the shape of the surfaces, and the like. Generally it is found that the residency time will vary from 1 to 10 minutes.

As indicated, the brazing temperature should be from the eutectic formation temperature which is approximately 540° C. for the ternary aluminum/copper/tin system and 510° C. for the quaternary aluminum/copper/tin/silver system, and can go up to the melting point of the aluminum alloy materials.

It is believed that the invention will be better understood from the following specific examples:

EXAMPLE I

Two plates of a conventional aluminum alloy 2024, which is comprised of 4.5 weight percent copper, 0.6 weight percent manganese and 1.5 weight percent magnesium, with the remainder being aluminum, were joined in accord with this invention. Each plate was 1 x 4 inches.

One surface desired to be coated in accord with the invention was first cleaned by placing it in a solution of 30% nitric 1% hydrofluoric acid for 2 minutes. It was then placed in a plating bath of copper sulfate and a copper layer was electrodeposited at 40 mg. per square inch of surface. The copper plated surface was then coated with silver by electroplating in a silver cyanide solution. The amount of silver deposited was 16 mg. per square inch of surface. Finally, a layer of tin was coated on by electroplating. The amount of tin was 40 mg. per square inch of surface. The coated surface was then placed in contact with the uncoated one which had been previously cleaned of grease and dirt. The two pieces were then held down with only enough weights as to assure intimate contact of the mating surfaces and placed in an oven at 510° C. and held for 5 minutes at which time a good flow of the braze material was obtained with excellent wetting action. The two pieces were then removed from the oven and allowed to cool before analysis. The joint was sectioned and metallographically mounted for electron microprobe analysis. Photographs of the back-scatter electron pattern obtained during the microprobe analysis showed segregation of nearly pure tin into small areas along the joint. The center of the joint was estimated to contain 31.5% copper, 35% silver and 33.5% aluminum. Progressing from the center of the joint toward the joint sides, the copper content remained approximately constant while the aluminum content increased to 67% and the silver content decreased to approximately 1%.

EXAMPLE II

A section of aluminum alloy 3003 honeycomb core was cleaned chemically and placed in intimate contact on both sides of the core with aluminum 6061 alloy sheets that had been cleaned, copper plated and tin plated. The copper coating was 40 mg. per square inch and the tin plating was 40 mg. per square inch. The assembly was exposed at 540° C. in an argon atmosphere at a pressure of 300 torr. It was held at that temperature until good wetting, flow and filleting around the core was observed. This occurred in about 5 minutes. The honeycomb core was comprised of 0.002 inch aluminum foil while the aluminum sheets utilized were of 0.010 inch thickness. The resultant product clearly demonstrated that it was possible to fluxlessly braze aluminum sandwich panels containing nonperforated honeycomb core. Additionally, and of just as great importance, the example demonstrated that the method of this invention could be utilized with foils due to its low erosion, so that application such as the fabrication of heat exchangers and radiators could effectively utilize the invention wherein the past contaminants and corrodents such as fluxes could not have been tolerated.

EXAMPLE III

In this example, a series of corrugated core sandwich panels were fabricated utilizing 0.040 inch thick sheets of aluminum alloy 6061 which is comprised of 1% magnesium, 0.2% chromium, 0.6% silicon, 0.25% copper, with the remainder being aluminum. The corrugations were approximately ½" high with a wave length of 1.3 inches. One surface of each adjacent sheet forming the panel was coated with 40 mg. per square inch of copper and 40 mg. per square inch of tin. The panels were then brazed at 540° C. for 5 minutes. Flatwise tension, edgewise compression and beam flexure tests were performed on the specimens resulting from these panels. The results indicated that structurally sound joints were achieved utilizing the brazing method of the invention. Additionally, the resultant brazed panels were solution treated, quenched and aged so that the 6061 alloy achieved at least a —T4 condition with increased joint strength and overall mechanical properties. Many prior braze joints are not susceptible to such treatment.

What is claimed is:
1. A method of brazing aluminum members comprising:
   coating one of the mating surfaces of the members with a layer of copper,
   depositing a layer of tin covering said layer of copper, the amount of tin being sufficient to penetrate an oxide coating on the aluminum members and form a ternary eutectic liquid,
   placing the mating surfaces of said members together,
   heating said members to at least the eutectic temperature of a ternary aluminum/copper/tin alloy system.
2. The method of claim 1 comprising coating said aluminum member with at least 10 mg. per square inch of copper and about an equal amount of tin.
3. The method of claim 2 comprising coating said aluminum member with between 30 and 60 mg. per square inch of copper and about an equal amount of tin.
4. The method of claim 1 comprising heating said members to at least 540° C.
5. The method of claim 1 further comprising:
   coating said copper layer with a layer of silver prior to the deposition of said tin coating.
6. The method of claim 5 comprising depositing an amount of silver equal to between 4 and 40 weight percent of the total amount of the copper and tin layers.
7. The method of claim 6 wherein the amount of silver deposited is equal to 17 weight percent of the total amount of the copper and tin layers.
8. The method of claim 5 wherein said members are heated to at least the eutectic temperature of the quaternary aluminum/copper/tin/silver system.
9. The method of claim 7 comprising heating said members to at least 510° C.

References Cited

UNITED STATES PATENTS

| | | | |
|---|---|---|---|
| 2,513,365 | 7/1950 | Rogoff | 29—504X |
| 2,766,195 | 10/1956 | Combs et al. | 29—197X |
| 3,180,022 | 4/1965 | Briggs et al. | 29—502X |
| 3,393,446 | 7/1968 | Huges et al. | 29—504X |
| 3,416,218 | 12/1968 | Armenoff et al. | 29—504X |

JOHN F. CAMPBELL, Primary Examiner

R. J. SHORE, Assistant Examiner

U.S. Cl. X.R.

29—502, 504